(No Model.)
A. C. MATHER.
GEARING FOR ELECTRIC CAR MOTORS.
No. 575,724. Patented Jan. 26, 1897.
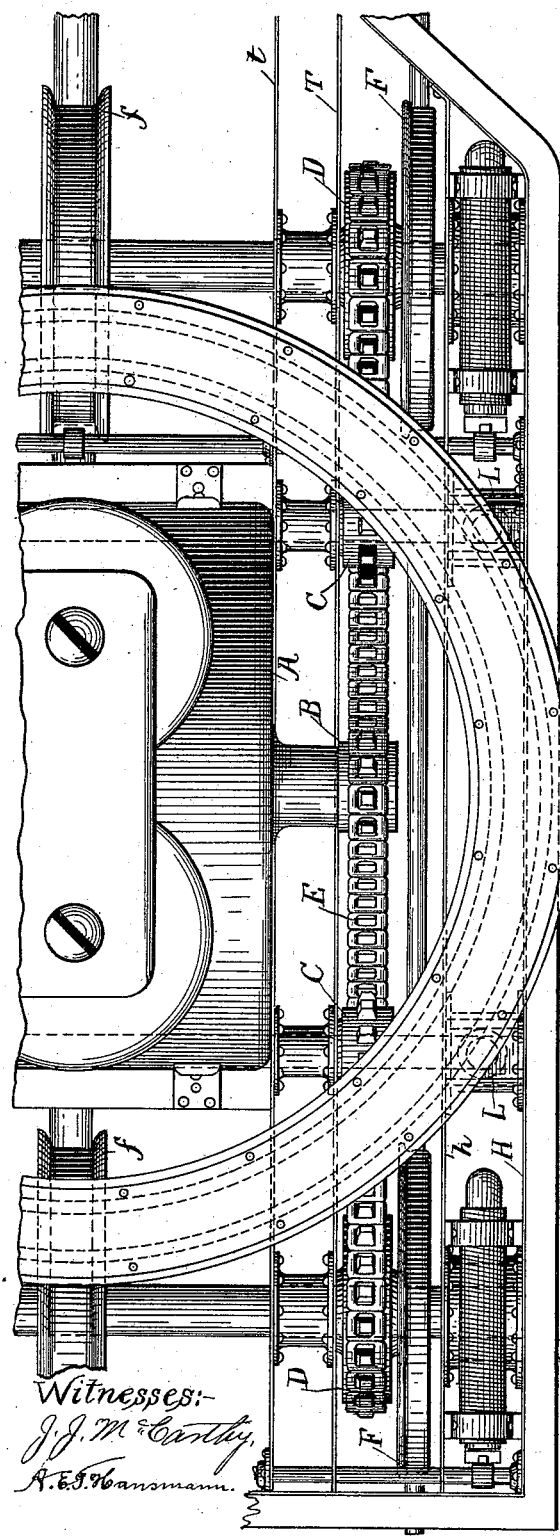
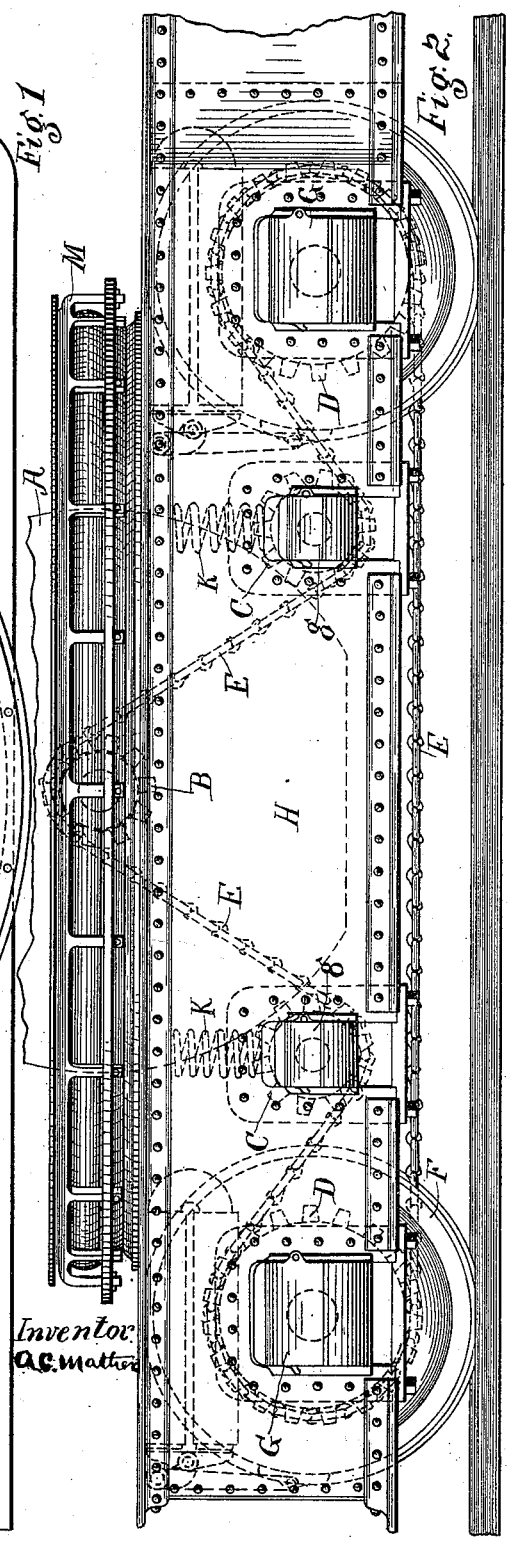
Witnesses:
J. J. McCarthy
R. E. J. Hansmann
Inventor:
A. C. Mather

UNITED STATES PATENT OFFICE.

ALONZO C. MATHER, OF CHICAGO, ILLINOIS.

GEARING FOR ELECTRIC-CAR MOTORS.

SPECIFICATION forming part of Letters Patent No. 575,724, dated January 26, 1897.

Application filed December 1, 1893. Serial No. 492,520. (No model.)

*To all whom it may concern:*

Be it known that I, ALONZO C. MATHER, a citizen of the United States, residing in Chicago, in the county of Cook and State of Illinois, have invented a certain new and useful Improvement in Gearing for Electric-Car Motors, of which the following is a specification.

My invention relates to that style of railroad-trucks in which the motor is placed directly on the truck and to be connected to the car-body by a bearing which encircles said motor, admitting of its projecting into the car-body, said truck and its various parts being the subject of another application and are not claimed as part of this.

The object of my device is to enable me to use a large and powerful motor, and obtain a positive connection between the motor and the wheels placed both in front of and behind the motor, and yet have said connection applied in such a manner that it will be able to give slightly at the starting of the motor, and thus avoid the "jump" that a truck is liable to give at such times and strain on the gearing.

In the drawings, Figure 1 is a plan of my invention, and Fig. 2 is an elevation of the same.

Similar letters refer to similar parts in both views.

In the drawings, A represents the motor, which may be of any improved pattern. Said motor rests upon the plates T $t$ of the truck.

B represents the driving-sprocket wheel, which is placed upon the shaft of the motor.

C is the idler-sprocket wheel, whose axle runs in the box $g$.

D is the driven sprocket and is placed on the axle of the driving-wheels of the trucks. This axle runs in the box $g$, which box is similar to that in ordinary service.

H $h$ are plates of the truck, between which the boxes are placed.

K represents the spring by which means the sprocket-wheel G holds the chain E tight.

L is a plate placed between the plates H $h$, which holds the spring K in pressing down the idler-sprocket.

M is a pneumatic spring, and is the subject of another application.

E is the chain connection and may be made of any kind of a belt or link connection, the latter being the kind illustrated in the drawings.

In the operation of the motor by this means the link-belt connection is passed over the driving-sprocket, thence it passes under the two idler-sprockets to the sprocket-wheels placed on the driving-axle of the truck and around said sprocket-wheels, passing straight across between them at the bottom, thus making a complete circuit. In running, the spring placed between the idler-sprocket box $g$ and the plate L enables the wheel to move up a little, and thus take up the sudden movement of the motor, and enables an easy and more even running.

Having thus described my improvements, what I desire to claim as my invention and secure by Letters Patent of the United States is as follows:

In combination, a car-truck bearing for connecting the car-body to the truck, said bearing encircling an electric motor, said motor mounted with its armature-shaft horizontal, pinions on the shaft of said motor, sprocket-wheels on the axle of the truck, a link chain, two toothed tighteners, and springs, one on each side of the armature-shaft, substantially as shown and described.

ALONZO C. MATHER.

Witnesses:
J. J. MCCARTHY,
A. E. T. HANSMANN.